US006409375B1

(12) United States Patent
Knight

(10) Patent No.: US 6,409,375 B1
(45) Date of Patent: Jun. 25, 2002

(54) PRECISION INJECTED LIQUID CHEMICAL MIXING APPARATUS

(76) Inventor: Brian George Knight, Wireless Hill, South Luffenham, Oakham, Rutland LE15 8NF (GB)

(*) Notice: Subject to any disclaimer, the term of this patent is extended or adjusted under 35 U.S.C. 154(b) by 0 days.

(21) Appl. No.: 09/601,557
(22) PCT Filed: Feb. 2, 1999
(86) PCT No.: PCT/GB99/00333
§ 371 (c)(1),
(2), (4) Date: Sep. 27, 2000
(87) PCT Pub. No.: WO99/39834
PCT Pub. Date: Aug. 12, 1999

(30) Foreign Application Priority Data

Feb. 4, 1998 (GB) .............................. 9802316

(51) Int. Cl.[7] .................................. B01F 5/00
(52) U.S. Cl. ................. 366/136; 366/138; 366/163.2
(58) Field of Search .................. 366/136, 137, 366/138, 159.1, 163.1, 163.2, 167.1; 137/563

(56) References Cited

U.S. PATENT DOCUMENTS 3,143,295 A * 8/1964 Booker
3,244,407 A * 4/1966 Obergfell et al.
3,491,949 A * 1/1970 Hairston
3,512,713 A * 5/1970 Carlyon, Jr.
3,913,606 A * 10/1975 Anderson, Jr.
3,976,087 A * 8/1976 Bolton et al.
4,863,277 A * 9/1989 Neal et al.
5,050,995 A * 9/1991 Lucore, II
5,769,536 A * 6/1998 Kotylak
5,779,355 A * 7/1998 Pullman

FOREIGN PATENT DOCUMENTS

| BE | 550642 | * | 9/1956 |
| FR | 1476902 | * | 4/1967 |
| WO | WO 89/10050 | | 11/1989 |
| WO | WO 96/31118 | | 10/1996 |

* cited by examiner

Primary Examiner—Charles E. Cooley
(74) Attorney, Agent, or Firm—Townsend and Townsend and Crew LLP

(57) ABSTRACT

The invention relates to an agricultural spray apparatus whereby chemical to be sprayed is injected into spray liquid before the mixture of liquid and chemical is sprayed. The invention comprises a closed loop circulating system having a pump with an inlet and an outlet, a loop line connecting the pump inlet and outlet, a spray nozzle connected to the loop line downstream of the pump via a spray line, a spray liquid inlet connected to the loop line upstream of the pump, a chemical injection system connected to the loop line upstream of the pump and downstream of the spray liquid inlet, a venturi device, a return line, an agitation line, and a valve device in the spray line, reversing liquid flowing to the spray nozzle through the agitation line past the spray nozzle and through the return line.

7 Claims, 1 Drawing Sheet

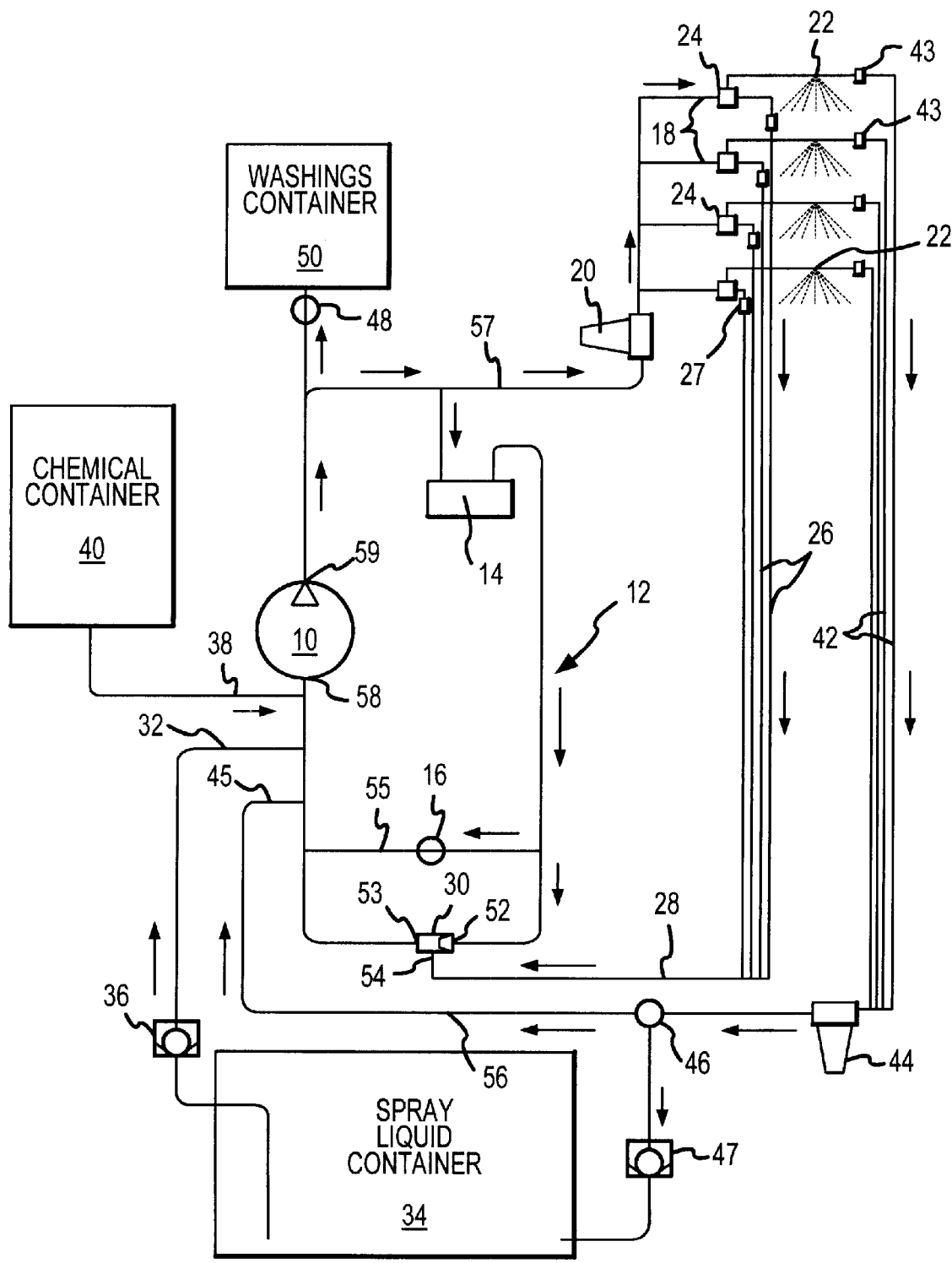

PRECISION INJECTED LIQUID CHEMICAL MIXING APPARATUS

TECHNICAL FIELD

The invention relates to spray apparatus and more particularly to injected liquid chemical spray apparatus or use in agriculture or horticulture.

BACKGROUND ART

As an aid to precision farming it is known to provide chemical spray apparatus arranged to vary the rate at which a desired chemical is applied (for example according to local conditions or the ground speed of the spray apparatus) by injecting the chemical directly into the spray liquid e.g. water shortly before it is applied. In this the volume of spray liquid sprayed remains substantially constant in terms of volume per unit area and only the concentration of the sprayed chemical in the spray liquid is varied.

It is known that chemical injection systems may operate with high or low pressure injection pumps. A high pressure injection pump can inject chemical close to the spray nozzle as it has sufficiently high pressure to overcome the pressure of the pumped water. Unfortunately, however, this makes calibration of the injection system difficult as any change in the back pressure of the system affects the output of the injection pump. Low pressure injection injects chemical before the sprayer's main pump where the pressure remains virtually atmospheric. This allows accurate calibration of the amount of chemical mixed with the water but is slower acting than the high pressure injection since the chemical is injected a significant distance from the spray nozzle.

An object of the present invention is to provide an arrangement which maintains the advantages of low pressure injection of the chemical whilst overcoming or alleviating the disadvantages of the known systems.

DISCLOSURE OF INVENTION

According to the invention there is provided spray apparatus of the kind in which chemical to be sprayed is injected into spray liquid before the mixture of liquid and chemical is sprayed e.g. for agricultural use, comprising a closed loop circulating system having a pump with an inlet and an outlet, a loop line connecting the pump inlet and outlet, a spray nozzle connected to the loop line downstream of the pump via a spray line, a spray liquid inlet connected to the loop line upstream of the pump and a chemical injection system connected to the loop line upstream of the pump. The spray apparatus may comprise a venturi device having an inlet and an outlet in the loop line, and having a suction or side port, a return line connection to the spray line at a position adjacent to the spray nozzle and connection to the suction port of the venturi device, an agitation line connected between the loop line downstream of the venturi device and the spray line adjacent the spray nozzle and valve means in the spray line directing liquid flow to the spray nozzle to cause reverse flow through the agitation line past the spray nozzle and through the return line. Further the spray apparatus may comprise a venturi bypass in the loop and bypass valve means in the bypass to control flow through the bypass and thus to control operation of the venturi device.

A container for spray liquid may be connected to the spray liquid inlet.

The spray apparatus may comprise a container for clean washing liquid, and means for connecting the clean washing liquid container to the agitation line to allow washing liquid to be drawn into the agitation line, spray line and the loop line. The spray apparatus may comprise a container for receiving washings, means connecting the washings container to the loop line and washings valve means controlling the connecting means. The clean washing liquid container is preferably the spray liquid container.

From another aspect the invention is agricultural spray means comprising spray apparatus as described above.

BRIEF DESCRIPTION OF DRAWINGS

The invention is diagrammatically illustrated by way of example in the accompanying drawing which is a circuit or flow diagram of an agricultural or horticultural spray apparatus.

BEST MODE FOR CARRYING OUT THE INVENTION

In the drawing there is shown agricultural spray apparatus generally of the kind described in my patent EP-B-0 820 224. The apparatus of my patent EP-B-0 820 224 is intended for use in a sprayer in which liquid chemical to be sprayed is mixed with water and held in diluted form in a tank, the apparatus further comprising means for supplying a liquid spray chemical from the holding tank to spray nozzles via a pump to produce a series of sprays. Although not shown in the drawing accompanying EP-B-0 820 224, the spray apparatus is usually mounted on an agricultural tractor or on a tractor-drawn trailer and comprises a spray boom having a pair of laterally extendible arms carrying the spray nozzles at intervals along their lengths so that an area of land many meters wide can be treated with sprayed chemical at each pass of the tractor. Each arm of the spray boom usually comprises a plurality of hinged sections which can be folded, e.g. for storage, transport or to vary the effective boom length. Such apparatus is well known as such.

In the apparatus of my patent EP-B-0 820 224, the output of the pump is fed to three-way valves by which flow of liquid to the individual spray nozzles or different sections of the boom can be shut off when appropriate. The outputs from the three-way valves are fed either to lines connected directly to the spray nozzles or are diverted to power a venturi device. The spray nozzles are also connected to agitation lines under the control of valves which permit flow only in one direction. Thus when spraying is halted, e.g. at the end of each bout, feed of liquid to the spray nozzles is discontinued and instead liquid is diverted to power a venturi device to cause a depression in return lines to cause liquid to circulate past the spray nozzles in counterflow via the agitation lines.

The spray apparatus of the present invention is intended for use where the chemical to be applied is maintained in concentrated form until immediately before it is to be applied and is only injected into water or other spray liquid at the last moment before spraying so that there is no requirement for batch mixing of the spray chemical and spray liquid and thus minimum wasting of chemical and reduced risk of pollution.

In the present invention the spray apparatus comprises a closed loop circulating system comprising a pump 10 having an inlet 58 and an outlet 59, a loop line 12 to which the inlet and outlet of the pump 10 are connected and which loop includes a pressure regulator 14 and a venturi device 30, the arrangement being that the inlet 52 and outlet 53 of the venturi are in the loop, with its side or suction port 54 connected as described below. A by-pass 55 is arranged in the line 12 to short-circuit and thus disable the venturi 30 under the control of a valve 16 adapted to close or open the by-pass.

Spray lines 18 are connected via a filter 20 and line 57 to line 12 and lead to spray nozzles 22 via three-way valves 24 which allow liquid from line 12 to be fed to the nozzles 22.

Upstream of pump inlet 58, a water inlet 32 couples the line 12 to a container 34 for clean water or other spray liquid via a one-way valve 36. Again upstream of the pump inlet 58 an inlet 38 enables spray chemicals to be injected into the line 12 from a source 40.

Agitation lines 42 are connected to the spray nozzles 22 via non-return valves 43 and are coupled together into a single line 56 connected to the line 12 at 45 via a filter 44. A valve 46 is provided in the line 56 to connect the agitation lines 42 to the clean water supply 34 or the agitation line 56. Valve 46 is connected to the clean water supply by a non-return valve 47. Downstream of the pump 10 the line 12 is connected via a valve 48 to a washings container 50.

As described above the valves 24 connect the loop line 12 to the spray nozzles 22. In the alternative position of the valves 24, they connect the agitation lines 42 to return lines 26 via non-return valves 27. The return lines are coupled together into a single line 28 and taken to the vacuum port 54 of the venturi device.

In normal use spraying the pump 10 is operated so that water or other spray liquid is withdrawn from the container 34 and fed via valve 36 into the loop line 12, and the chemical injection system 40 is operated to inject chemical into line 12 at 38. The chemical mixes with the water or other spray liquid and is pumped around the loop line 12. At this time valve 48 is closed and the chemical/water mixture is taken from line 12 through line 57 and via filter 20 and the valves 24 to the spray lines 18 and spray nozzles 22 so that the mixture is sprayed therefrom. Valve 16 is at this time open to bypass the venturi 30 and valve 46 is in a position to connect the agitation lines 42 to loop line 12.

As dilute chemical is drawn from the loop line to the spray nozzles during spraying the system is replenished with clean water from the supply and more chemical from the injection system. It will be seen that the chemical/water mixture will be at its greatest concentration in line 12 at about inlet 45, that the mixture will be diluted at inlet 32 by the clean water drawn from container 34 and that the concentration will be again increased at inlet 38 when additional chemical is injected into line 12.

It will be appreciated that when used in this way the system is capable of spraying a desired quantity of chemical admixed with water taken from the container 34. When it is decided to stop spraying the spray nozzles 22 are disabled by switching the valves 24 to connect the return lines 26 to the agitation lines and valve 16 is closed such that the venturi device 30 receives the full flow in the line 12. This creates a vacuum at the side port 54 of the venturi device 30 to draw liquid from the return lines 26 so that liquid is fed from the line 12 via the agitation lines 42 past the spray nozzles 22 and to the return lines 26.

If valve 46 is operated at this time to connect the agitation lines 42 to the clean water supply it will be appreciated that the system can be cleaned. If at the same time valve 48 is opened the washings from the apparatus can be passed to and stored in container 50. This enables the washings to be disposed of separately. If it is desired to remove the mixture of spray chemical and spray liquid from the spray lines—for example for transporting the apparatus—the washings may be re-injected into the apparatus when spraying starts again.

INDUSTRIAL APPLICABILITY

A particular advantage of the described arrangement is that it is possible by injecting a precise volume of chemical into the previously cleaned system to prime not only the closed loop but also the spray lines. If this is done the apparatus will spray chemical from the nozzles as soon as spraying starts. Normally the sprayer would have to stand and spray until the chemical reaches the nozzles.

The invention thus provides a low pressure chemical injection spray apparatus which avoids the problems of slow response and which also gives improved chemical mixing by returning bypass chemical to the pump in a continuous loop.

What is claimed is:

1. Spray apparatus of the kind in which chemical to be sprayed is injected into spray liquid before the mixture of liquid and chemical is sprayed, comprising a closed loop circulating system having a pump with an inlet and an outlet, a loop line connecting the pump inlet and outlet, a spray nozzle connected to the loop line downstream of the pump via a spray line, a spray liquid inlet connected to the loop line upstream of the pump and downstream of the spray liquid inlet, a chemical injection system connected to the loop line upstream of the pump, a venturi device having an inlet and an outlet in the loop line, and having a suction or side port, a return line connected to the spray line at a position adjacent to the spray nozzle and connected to the suction port of the venturi device, an agitation line connected between the loop line downstream of the venturi device and the spray line adjacent the spray nozzle and valve means in the spray line directing liquid flow to the spray nozzle to cause reverse flow through the agitation line past the spray nozzle and through the return line.

2. Spray apparatus according to claim 1, comprising a venturi bypass in the loop line and bypass valve means in the bypass to control flow through the bypass and thus to control operation of the venturi device.

3. Spray apparatus according to claim 1 comprising a container for spray liquid connected to the spray liquid inlet.

4. Spray apparatus according to claim 3, comprising a container for clean washing liquid, and means for connecting the lean washing liquid container to the agitation line to allow washing liquid to be drawn into the agitation line, spray line and the loop line.

5. Spray apparatus according to claim 4, comprising a container for receiving washings, means connecting the washings container to the loop line and washings valve means controlling the connecting means.

6. Spray apparatus according to claim 4, wherein the clean washing liquid container is the spray liquid container.

7. Agricultural spray means comprising the spray apparatus of claim 1.

* * * * *